United States Patent
Güngördü

(10) Patent No.: US 9,445,678 B2
(45) Date of Patent: Sep. 20, 2016

(54) REMOVAL SAFEGUARD FOR KNIFE BLOCKS

(71) Applicant: NEWTEC GMBH, Solingen (DE)

(72) Inventor: Ali Güngördü, Solingen (DE)

(73) Assignee: NEWTEC GmbH, Solingen (DE)

( * ) Notice: Subject to any disclaimer, the term of this patent is extended or adjusted under 35 U.S.C. 154(b) by 0 days.

(21) Appl. No.: 14/647,767

(22) PCT Filed: Nov. 15, 2013

(86) PCT No.: PCT/DE2013/000682
§ 371 (c)(1),
(2) Date: May 27, 2015

(87) PCT Pub. No.: WO2014/082615
PCT Pub. Date: Jun. 5, 2014

(65) Prior Publication Data
US 2015/0297008 A1   Oct. 22, 2015

(30) Foreign Application Priority Data
Nov. 27, 2012   (DE) .......................... 20 2012 011 342

(51) Int. Cl.
*A47G 21/14*   (2006.01)
(52) U.S. Cl.
CPC ........... *A47G 21/14* (2013.01); *A47G 2200/10* (2013.01); *A47G 2200/106* (2013.01)
(58) Field of Classification Search
CPC .............. A47G 21/14; A47G 2200/10; A47G 2200/106
USPC .................................. 211/70.7, 70.1, 70.6, 69
See application file for complete search history.

(56) References Cited

U.S. PATENT DOCUMENTS

| | | | | |
|---|---|---|---|---|
| 3,490,601 | A | * | 1/1970 | Warn, Sr. ............... A47G 21/14 206/372 |
| 2007/0210021 | A1 | * | 9/2007 | Whitehead ............... B25H 3/04 211/70.6 |
| 2009/0218302 | A1 | * | 9/2009 | Winnard ................ B25H 3/003 211/70.6 |

FOREIGN PATENT DOCUMENTS

| | | | |
|---|---|---|---|
| DE | 29 702 269 U1 | 7/1997 | |
| GB | 2466253 A * | 6/2010 | ............ A47G 21/14 |
| JP | S4913250 U | 2/1974 | |
| JP | S54126839 U | 9/1979 | |
| JP | H10192174 A | 7/1998 | |
| JP | 2009005914 A | 1/2009 | |
| JP | 2010063580 A | 3/2010 | |

OTHER PUBLICATIONS

International Search Report dated Feb. 28, 2014 for related PCT Application No. PCT/DE2013/000682.

* cited by examiner

*Primary Examiner* — Michael Safavi
(74) *Attorney, Agent, or Firm* — Howard IP Law Group

(57) ABSTRACT

A removal safeguard for a knife block, into which at least one knife having a blade can be inserted, includes a cover part, which has at least one recess, and a template, having at least one cut-out, mounted slidably with respect to the cover part, wherein in a first position the recess and the cut-out are aligned to one another in such a manner that a passage of the blade is possible, and in a second position the passage of the blade is blocked.

2 Claims, 4 Drawing Sheets

REMOVAL SAFEGUARD FOR KNIFE BLOCKS

CROSS-REFERENCE TO RELATED APPLICATIONS

This application is the national stage application under 35 U.S.C. §371 of International Application No. PCT/DE2013/000682, filed Nov. 13, 2013, and claims the benefit under 35 U.S.C. §119(a)-(d) of International Application No. PCT/DE2013/000682, filed Nov. 15, 2013 and German Application No. 202012011342.9, filed Nov. 27, 2012, the entire disclosures of which are incorporated herein by reference in their entireties for all purposes.

FIELD OF INVENTION

The present invention relates to a removal safeguard for a knife block, in which at least one knife can be inserted with its blade.

BACKGROUND

Knife blocks of the above mentioned type are used in many kitchens for the practical storage of various knives. The knives are not only neatly sorted thereby, but the blades are also protected from damage. In particular, in households with small children, such knife blocks have proven to be disadvantageous, because the knives are also stored such that they are freely accessible to children, so that such knife blocks are associated with a significant risk of injury for children.

A further device for the storage of a knife is described in DE 29 702 269 U1. This device has a sheath for receiving the knife blades, wherein the sheath is formed by a base member and a cover, which can be removed from said base member, so that the interior of the sheath is accessible. The device may have a locking device, which engages with the knife handle and, when in a locked state, affixes the knife to the storage device. In this way, the knives are stored such that they are largely inaccessible to children.

The proposed removal safeguard is disadvantageously designed such that it is very complex and has many mechanical lever and locking elements, which can also break off.

SUMMARY

Starting from the known devices, the object of the invention is to provide a simple and stable removal safeguard for a knife block.

This object is achieved by the removal safeguard according to embodiments of the present disclosure. Accordingly, the removal safeguard has a cover part, which has at least one recess, and a template, which is mounted thereon such that it can be moved in a sliding manner, said template having at least one cut-out, wherein, in a first position, the cut-out and the recess are aligned with one another in such a way that it is possible to pass the blade therebetween, and in a second position, passing the blade therebetween is blocked. This removal safeguard is placed on the front side of a conventional knife block, and is detachably or non-detachably connected thereto. As such, in a first position, the recesses of the cover part, the cut-outs of the template and the receptacles of the knife block are aligned with one another in such a way that the knives can be removed from the knife block and re-inserted therein again. In the second position of the template, the recesses as well as the receptacles are at least partially covered by the template, so that the knives cannot be inserted into the knife block, nor can the knives be removed therefrom.

Preferred embodiments of the present invention are described below in the dependent claims.

Different mechanisms are provided in order to move the template. According to a first preferred embodiment, the template is at least partially made of a ferromagnetic material, so that the template can be displaced via the effect of a magnet. As a result, the template is held in the first position by the magnet, in which position the knife can be inserted into the knife block and/or the knife can be removed from the knife block. If the magnet is removed, the magnet no longer exerts an attractive effect on the template, so that said template falls into the second position due to gravity. In this position, the template at least partially covers the recesses and/or the receptacles so that the knives can no longer be removed due to the form-locking storage.

Alternatively, other means of displacing the template are provided. For example, the template may have a pusher, which extends laterally out of the cover part, and which is manually guided. If necessary, the pusher can be locked in the second position by means of a lock element, whereby a child safety device is likewise created.

The removal device is preferably designed as a separate component, which is selectively connected to the knife block. As a result, this provides the user with the advantage, in particular, that the removal device can be removed provided that the child safety device can be dispensed with.

BRIEF DESCRIPTION OF THE DRAWINGS

Specific embodiments of the present invention are explained below on the basis of the Figures. Shown are.

DETAILED DESCRIPTION

Figure 1A:
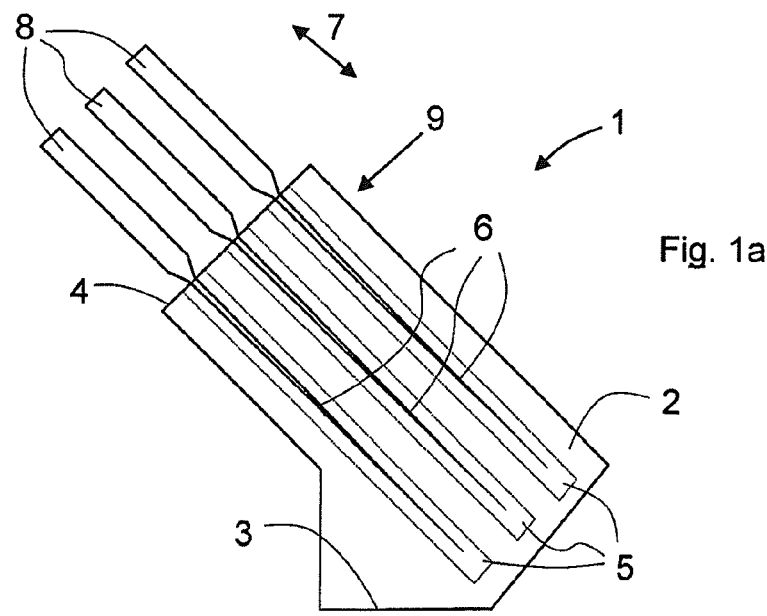
FIG. 1a, b knife blocks according to the prior art.
Figure 1B:
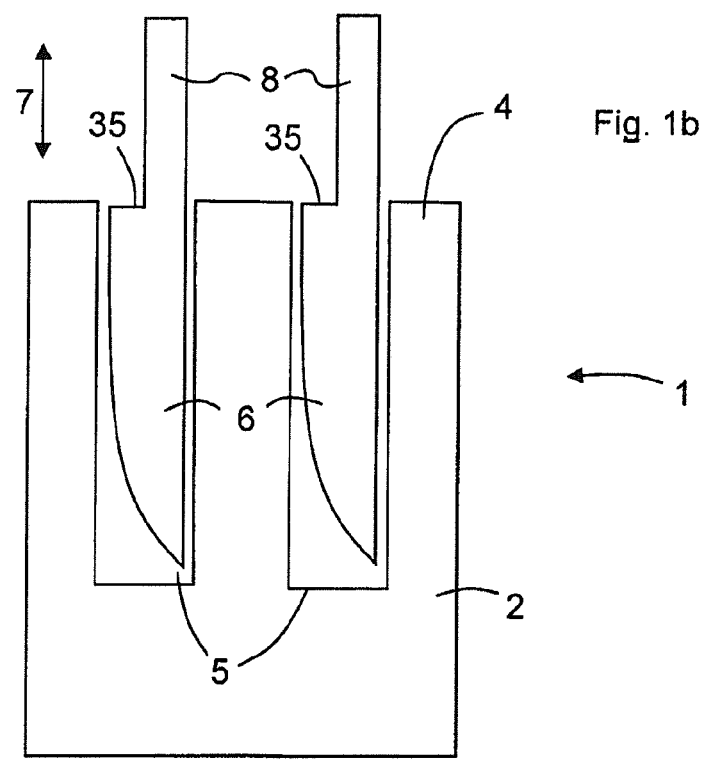

Knife blocks 1 of the known type comprise a massive block 2, which has a standing surface 3 and an end surface 4. Elongated receptacles 5 are introduced into the angularly disposed end surface 4, which are suitable for receiving knife blades 6. The knives 8 can be removed and reinserted into the knife block 1 in the direction of the arrow 7. FIG. 1b shows a front view (from the front view of 9, FIG. 1a) of the position of the knives 8.

Figure 2A:
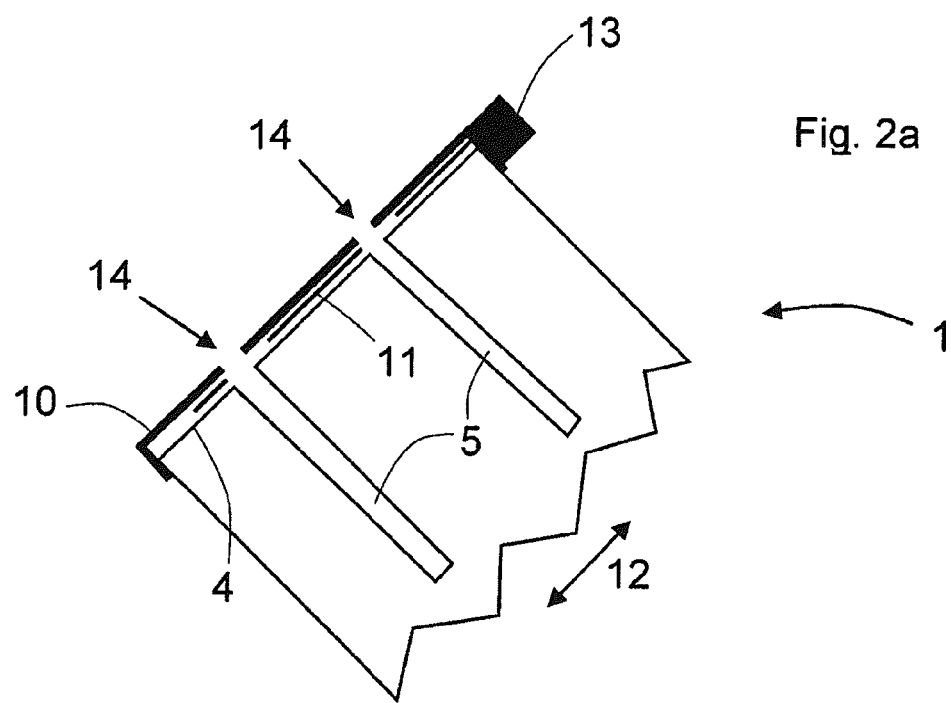
FIG. 2a, b schematic depictions of a removal safeguard in two different positions and FIG. 3a-d top views of the cover elements and templates in different positions.

Concrete embodiments of the invention are shown in FIGS. 2a, b and FIGS. 3a-d. Accordingly, a cover part 10 and a template 11 are placed on the front side 4 of the knife block 1 as a removal safeguard, which template is mounted between the cover part 10 and the front side 4 of the knife block 1 such that it can be moved in a sliding manner in the direction of the arrow 12. The ferromagnetic template 11 is held in the first position by the effect of a magnet 13 (FIG. 2a), in which the receptacles 5 are completely exposed so that the knives 8 can be inserted in the direction of the arrow 14.

Figure 2B:
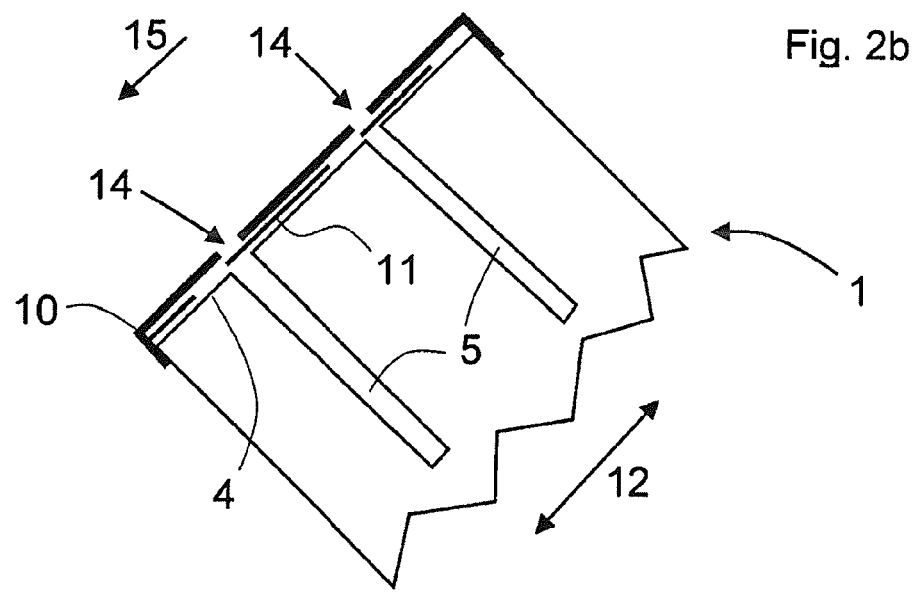

FIG. 2b, by contrast, shows the second position of the template 11, which, without the attractive effect of the magnet 13, slides in the direction of the arrow 15 due to gravity. As such, the template 11 covers the receptacles 5, at least in regions thereof, so that the knives (not depicted in FIGS. 2a and 2b) cannot be removed.

Figure 3A:
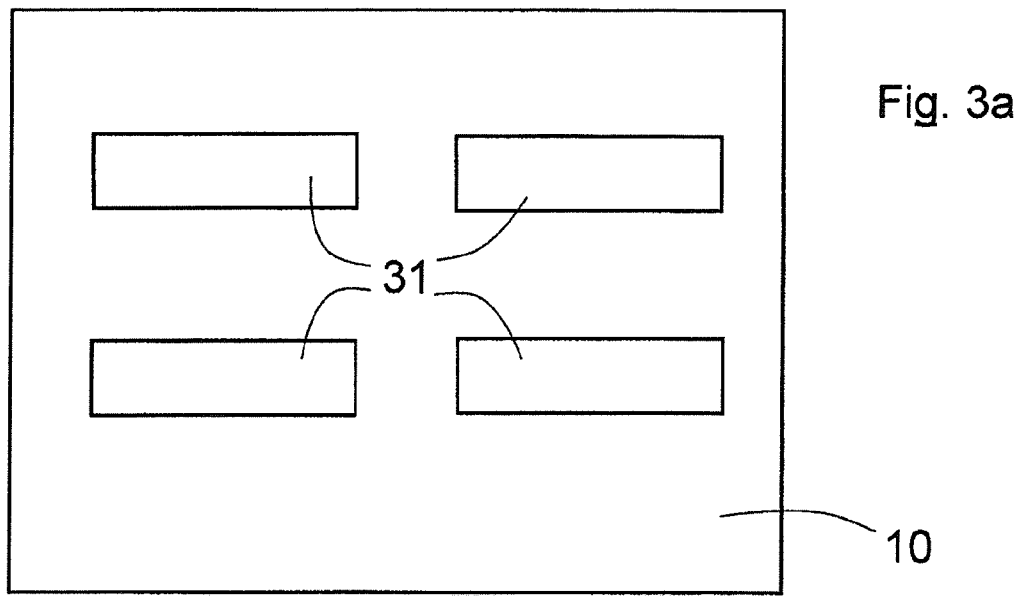
Figure 3B:
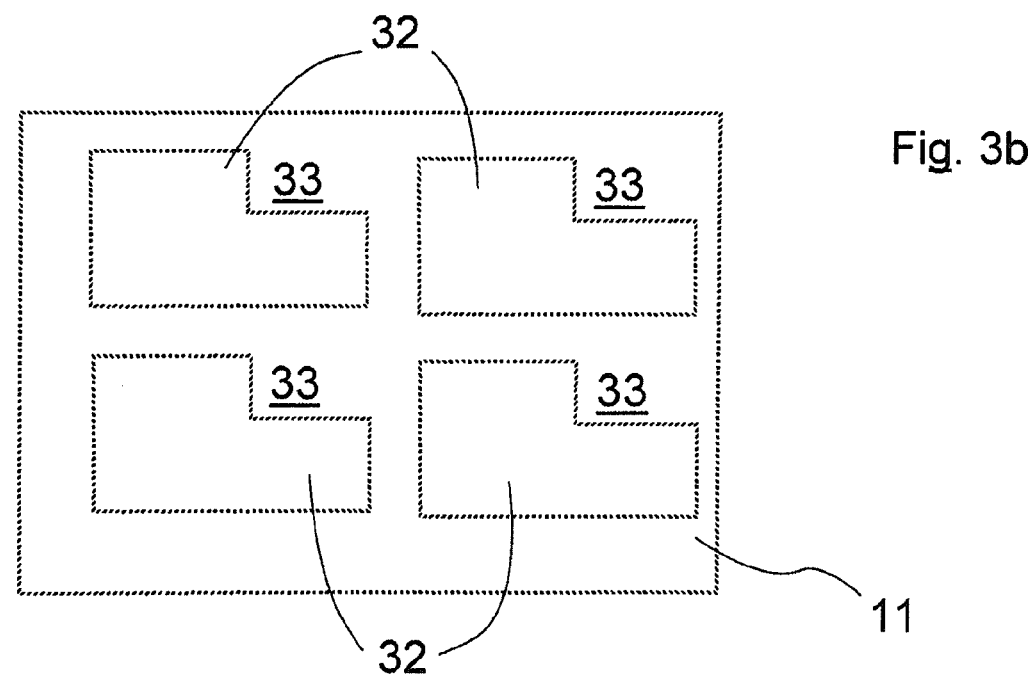
Figure 3C:
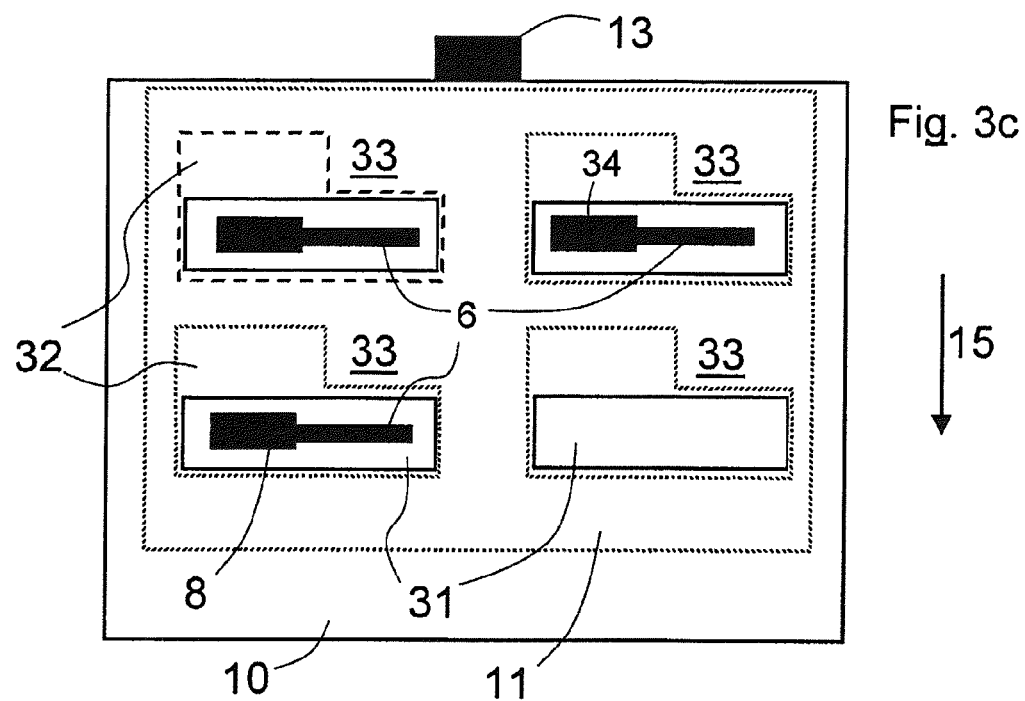
Figure 3D:
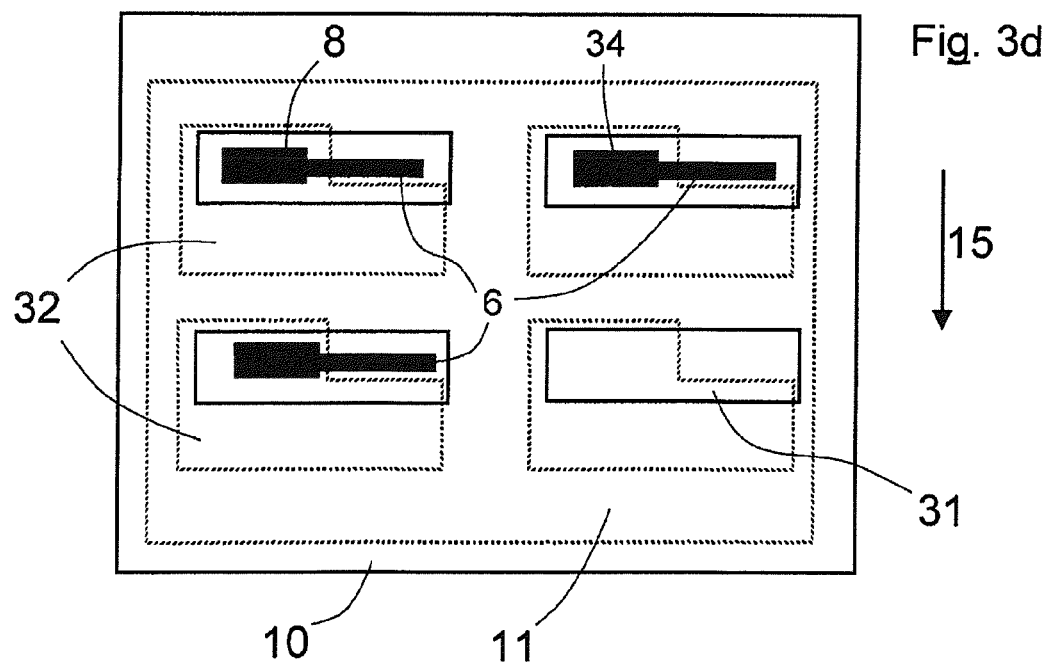

FIG. 3a shows a specific embodiment of a cover part 10 having recesses 31 introduced therein, which are formed such that they conform to the receptacles 5 in the knife block 1. By contrast, the template 11 (FIG. 3b) has L-shaped cut-outs 32, so that each cut-out 32 forms a tab 33, the function of which is evident from FIGS. 3c and 3d. Specifically, FIGS. 3c and 3d show a cover part 10 and a template 11, which are disposed one behind the other. As such, FIG. 3c depicts the first position, in which the receptacles 5 and the recesses 31 are exposed so that the knives 8 can be inserted and removed again. Once the magnet 13 has been removed, the template 11 is displaced in the direction of the arrow 15 due to the force of gravity and comes to rest in the second position depicted in FIG. 3d. There, the tabs 33 close the recesses 31 and the receptacles 5, at least in regions thereof, so that the knives 8 are stored in a form-fitting manner and cannot be removed. Specifically, the tabs 33 slide in front of the rear end 35 of the knife blades 6, whereas the knife handles 34 extend through the cut-outs 32.

The invention claimed is:

1. A removal safeguard for a knife block, in which a blade of at least one knife can be inserted into a receptacle, comprising:
    a cover part having at least one recess, and
    a template, mounted on the cover part to be moved in a sliding manner, said template having at least one cut-out, wherein, in a first position, the cut-out and the recess are aligned with one another in such a way that it is possible to pass the blade therebetween, and in a second position, passing the blade therebetween is blocked,
    wherein the template is at least partially made of a ferromagnetic material, so that the template can be displaced via the effect of a magnet, and wherein the template is held in the first position by the magnet, in which position the knife can be inserted into the knife block and/or the knife can be removed from the knife block.

2. The removal safeguard according to claim 1, wherein, without the attractive effect of the magnet, the template assumes the second position, so that the knife cannot be inserted into the knife block or removed from the knife block.

* * * * *